United States Patent
Shin et al.

(10) Patent No.: US 8,654,552 B2
(45) Date of Patent: Feb. 18, 2014

(54) INTERLEAVED TYPE POWER FACTOR CORRECTION CIRCUIT HAVING TRANSFORMER FORMING SEPARATED WINDING STRUCTURE

(75) Inventors: Yun Seop Shin, Gyunggi-do (KR); Sung Uk Lee, Gyunggi-do (KR)

(73) Assignee: Samsung Electro-Mechanics Co., Ltd., Gyunggi-Do, Korea (KR)

( * ) Notice: Subject to any disclaimer, the term of this patent is extended or adjusted under 35 U.S.C. 154(b) by 438 days.

(21) Appl. No.: 13/028,408

(22) Filed: Feb. 16, 2011

(65) Prior Publication Data

US 2012/0039094 A1    Feb. 16, 2012

(30) Foreign Application Priority Data

Aug. 12, 2010   (KR) ................ 10-2010-0077736

(51) Int. Cl.
*H02M 7/217*   (2006.01)

(52) U.S. Cl.
USPC ................ 363/89; 323/222; 323/272; 363/65

(58) Field of Classification Search
USPC ................ 363/65, 89; 323/222, 272
See application file for complete search history.

(56) References Cited

U.S. PATENT DOCUMENTS

| | | | | |
|---|---|---|---|---|
| 4,384,321 A | * | 5/1983 | Rippel | 363/124 |
| 7,023,716 B1 | * | 4/2006 | Wu | 363/89 |
| 8,098,505 B1 | * | 1/2012 | Choi | 363/89 |
| 8,217,746 B2 | * | 7/2012 | Kitajima et al. | 336/178 |
| 8,441,822 B2 | * | 5/2013 | de Groot et al. | 363/89 |
| 2007/0058402 A1 | * | 3/2007 | Shekhawat et al. | 363/89 |
| 2012/0039094 A1 | * | 2/2012 | Shin et al. | 363/21.04 |
| 2012/0049994 A1 | * | 3/2012 | Joo et al. | 336/233 |

FOREIGN PATENT DOCUMENTS

| | | |
|---|---|---|
| JP | 2003-002991 A | 1/2003 |
| JP | 2008-177139 A | 7/2008 |

* cited by examiner

*Primary Examiner* — Jeffrey Sterrett
(74) *Attorney, Agent, or Firm* — Lowe Hauptman & Ham, LLP

(57) ABSTRACT

There is provided an interleaved type power factor correction circuit having a transformer forming a separated winding structure, which is formed by integrating two inductors separately wound around the transformer. The interleaved type power factor correction circuit including a rectifying unit rectifying a commercial alternating current power, a transformer having a first inductor winding and a second inductor winding, a bobbin part, and a core part, a switching unit switching a power transmitted to the first and second inductor windings, a controlling unit controlling a switching operation of the switching unit in order to allow a phase difference between a current and a voltage of the switched power to satisfy a predetermined phase difference, and a stabilizing unit stabilizing the switched power from the switching unit.

7 Claims, 6 Drawing Sheets

| Vin | 90 Vac | 110Vac | 220Vac | 264 Vac |
|---|---|---|---|---|
| POWER FACTOR | 0.985 | 0.980 | 0.922 | 0.897 |
| HARMONICS | NORMAL | NORMAL | NORMAL | NORMAL |

FIG. 4A

| Vin | 90 Vac | 110Vac |
|---|---|---|
| POWER FACTOR | 0.985 | 0.980 |
| WAVEFORM | | |

| Vin | 220Vac | 240Vac |
|---|---|---|
| POWER FACTOR | 0.936 | 0.922 |
| WAVEFORM | | |

FIG. 4B

|  | GENERAL INTERLEAVED TYPE POWER FACTOR CORRECTION CIRCUIT | INTERLEAVED TYPE POWER FACTOR CORRECTION CIRCUIT ACCORDING TO THE PRESNT INVENTION |
|---|---|---|
| OUTPUT POWER | 234.18 [W] | 234.24 [W] |
| INPUT POWER | 248.86 [W] | 249.71 [W] |
| EFFICIENCY | 94.0 % | 93.9 % |

FIG. 4C

INTERLEAVED TYPE POWER FACTOR CORRECTION CIRCUIT HAVING TRANSFORMER FORMING SEPARATED WINDING STRUCTURE

CROSS-REFERENCE TO RELATED APPLICATIONS

This application claims the priority of Korean Patent Application No. 10-2010-0077736 filed on Aug. 12, 2010, in the Korean Intellectual Property Office, the disclosure of which is incorporated herein by reference.

BACKGROUND OF THE INVENTION

1. Field of the Invention

The present invention relates to a power factor correction circuit, and more particularly, town interleaved type power factor correction circuit having a transformer forming a separated winding structure, which is formed by integrating two inductors separately wound around the transformer.

2. Description of the Related Art

Recently, as an electronic product has become more personalized and miniaturized, a power supply device supplying a driving power to the electronic product has also required miniaturization.

In general, the power supply device converts a commercial alternating current (AC) power into the driving power. Accordingly, the power supply device may employ a power factor correction circuit correcting a phase difference between the current and voltage of a rectified power by switching a power which rectifies a commercial AC power, thereby improving a power factor; and a power converting circuit converting the power factor-improved power into the driving power.

That is, since the power supply device is required to be miniaturized, the power factor correction circuit employed therein also needs to be miniaturized.

SUMMARY OF THE INVENTION

An aspect of the present invention provides an interleaved type power factor correction circuit having a transformer forming a separated winding structure, which is formed by integrating two inductors separately wound around the transformer.

According to an aspect of the present invention, there is provided an interleaved type power factor correction circuit having a separated winding structure including: a rectifying unit rectifying a commercial alternating current (AC) power; a transformer including first and second inductor windings individually receiving the rectified power from the rectifying unit and performing energy charge and discharge according to a switching operation, a bobbin part including a bobbin body having a predetermined length, a through hole penetrating the bobbin body in a lengthwise direction of the bobbin body, and a winding area provided on an outer circumferential surface of the bobbin body and having the first and second inductor windings wound therearound and a partition physically separating the first and second inductor windings, and a core part including a pair of cores having a first leg formed by magnetic coupling through the through hole of the bobbin part and second and third legs individually formed by magnetic coupling without passing through the through hole; a switching unit individually switching the power transmitted to the first and second inductor windings; a controlling unit controlling the switching operation of the switching unit in order to allow a phase difference between a current and a voltage of the switched power to satisfy a predetermined phase difference; and a stabilizing unit stabilizing the switched power from the switching unit The first inductor winding and the second inductor winding may be wound in the same direction.

The switching unit may include a first switch switching the power transmitted to the first inductor winding, and a second switch switching the power transmitted to the second inductor winding.

The stabilizing unit may include a first diode, a second diode, and a capacitor. Here, the first diode may provide a transmission path of the power transmitted from the first inductor winding. The second diode may provide a transmission path of the power transmitted from the second inductor winding. The capacitor may be charged with the power transmitted from the first and second diodes to thereby stabilize the power.

The controlling unit may control the switching operation of the switching unit depending on a state of the power transmitted from the first and second diodes to the capacitor.

The pair of cores may be an EE core or an EI core.

BRIEF DESCRIPTION OF THE DRAWINGS

The above and other aspects, features and other advantages of the present invention will be more clearly understood from the following detailed description taken in conjunction with the accompanying drawings, in which:

FIGS. 4A through 4C show electrical characteristics of an interleaved type power factor correction circuit according to an exemplary embodiment of the present invention.

DETAILED DESCRIPTION OF THE PREFERRED EMBODIMENT

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

The present invention will be explained in detail with reference to the drawings, as below.

Figure 1:
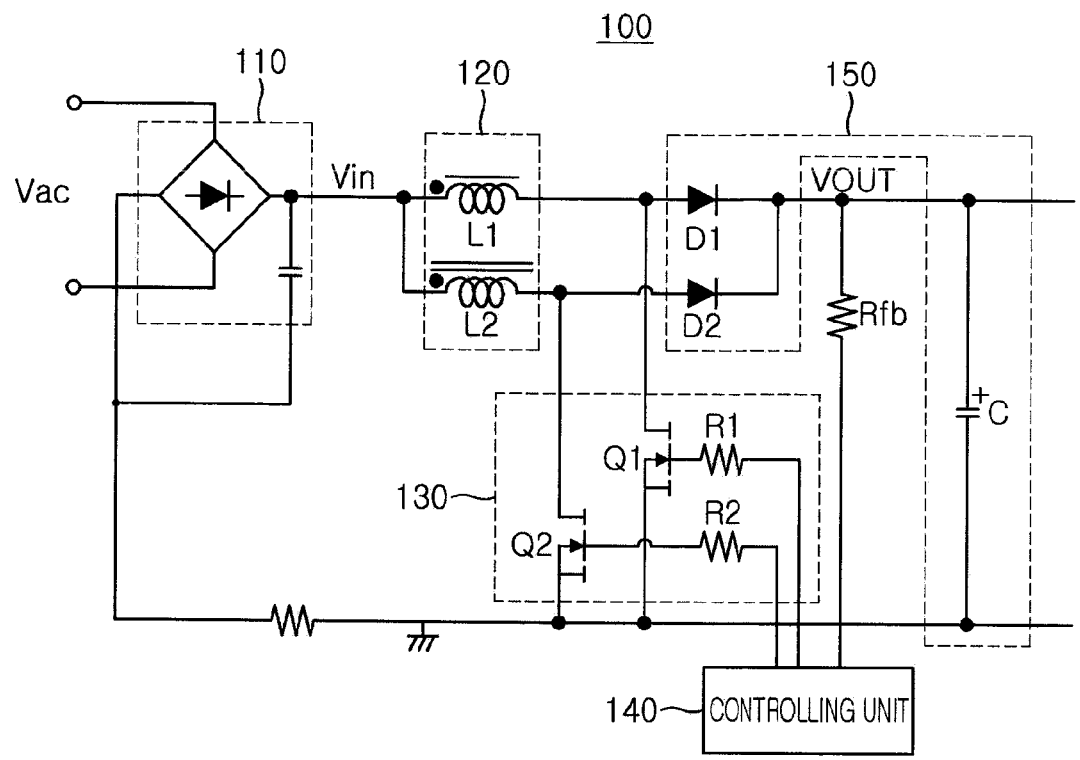
FIG. 1 is a schematic diagram of an interleaved type power factor correction circuit according to an exemplary embodiment of the present invention.

FIG. 1 is a schematic diagram of an interleaved type power factor correction circuit according to an exemplary embodiment of the present invention.

Referring to FIG. 1, an interleaved type power factor correction circuit 100 according to an exemplary embodiment of the present invention may include a rectifying unit 110, a transformer 120, a switching unit 130, a controlling unit 140, and a stabilizing unit 150.

The rectifying unit 110 including a bridge diode and a capacitor may perform the full wave rectification of a commercial alternating current (AC) power Vac being inputted thereto, and transmit a rectified power Vin to the transformer 120.

The transformer 120 may integrate a first inductor winding L1 and a second inductor winding L2 into a single transformer structure. The rectified power from the rectifying unit 110 may be inputted to the first and second inductor windings L1 and L2. According to the switching operation of the switching unit 130, the first and second inductor windings L1 and L2 may charge and discharge the energy of the rectified power. A more detailed description concerning the transformer 120 will be provided later, with reference to FIGS. 2A and 2B.

The switching unit 130 may switch the power inputted to the first and second inductor windings L1 and L2, thereby allowing energy charged in the first and second inductor windings L1 and L2 to be discharged and transmitted to the stabilizing unit 150.

Accordingly, the switching unit 130 may include a first switch Q1 and a second switch Q2. Here, the first switch Q1 is electrically connected to the first inductor winding L1 and discharges the energy charged in the first inductor winding L1. The second switch Q2 is electrically connected to the second inductor winding L2 and discharges the energy charged in the second inductor winding L2.

The controlling unit 140 controlling the switching operation of the switching ng unit 130, may control the switching operation of the switching unit 130 depending on a state of the power transmitted from the switching unit 130 to the stabilizing unit 150. That is, the controlling unit 140 may control the switching operations of the first and second switches Q1 and Q2 of the switching unit 130 in order to allow a phase difference between the current and the voltage of the switched power to satisfy a predetermined phase difference. Switching control signals for controlling the switching operations may be individually transmitted to first and second switches Q1 and Q2 through resistors R1 and R2.

The stabilizing unit 150 may stabilize the switched power from the switching unit 130 and output the stabilized power.

Accordingly, the stabilizing unit 150 may include a first diode and a second diode D1 and D2, and a capacitor C. Here, the first diode D1 may form a transmission path of the power transmitted from the first inductor winding L1. The second diode D2 may form a transmission path of the power transmitted from the second inductor winding L2. The capacitor C may be charged with the power transmitted from the first diode D1 and the second diode D2, to thereby stabilize the power.

Figure 2A:
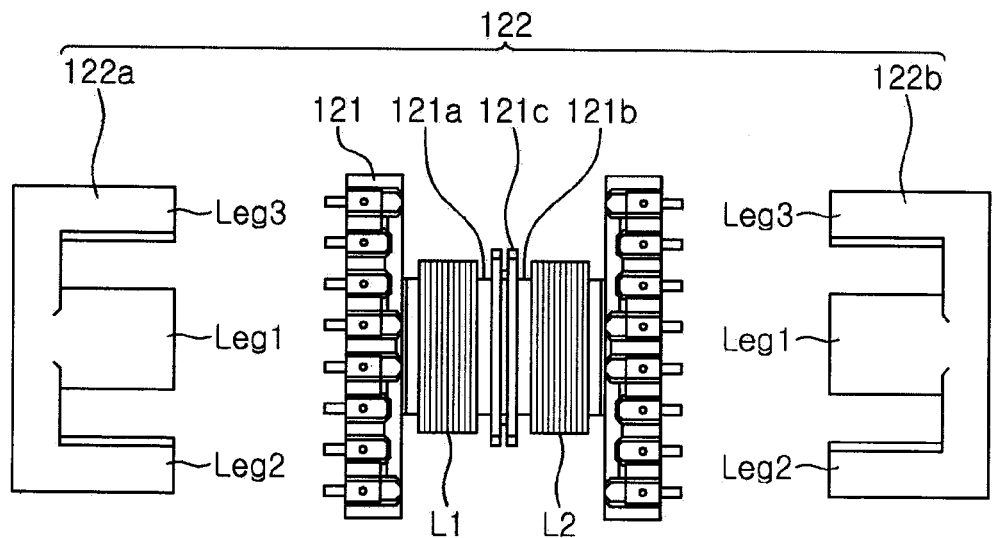
FIGS. 2A and 2B are a schematic plan view and a schematic side view of a transformer adopted in an interleaved type power factor correction circuit according to an exemplary embodiment of the present invention, respectively.
Figure 2B:
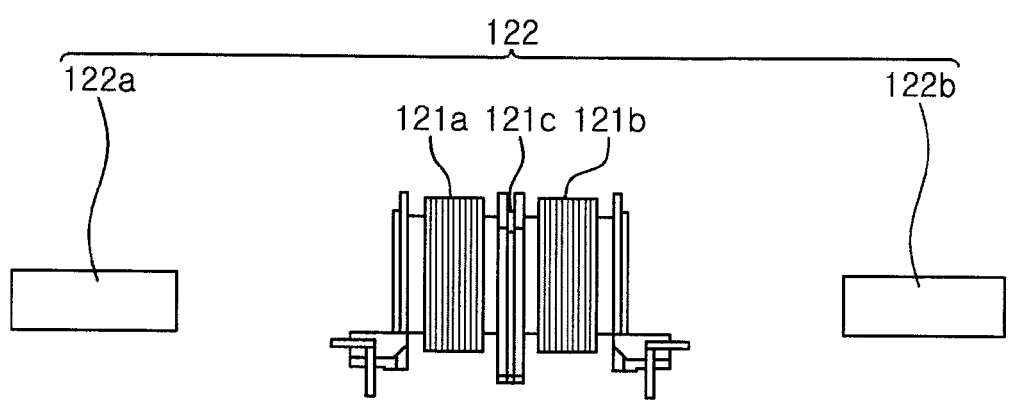

FIGS. 2A and 2B are a schematic plan view and a schematic side view of a transformer adopted in an interleaved type power factor correction circuit according to an exemplary embodiment of the present invention, respectively.

Referring to FIGS. 2A and 2B together with FIG. 1, the transformer 120 may include a bobbin part 121 and a core part 122.

The bobbin part 121 may include a bobbin body having a predetermined length. The bobbin body may have a through hole formed therein a length direction thereof. Winding areas 121a and 121b may be provided on the outer circumferential surface of the bobbin body in which the through hole is formed, having the first and second inductor windings L1 and L2 wound therearound.

The winding areas 121a and 121b may include a first winding area 121a and a second winding area 121b. The first inductor winding L1 may be wound around the first winding area 121a, and the second inductor winding L2 may be wound around the second winding area 121b. A partition 121c may be formed between the first winding area 121a and the second winding area 121b, in order to physically separate the first inductor winding L1 and the second inductor winding L2.

Since the first inductor winding L1 and the second inductor winding L2 are physically separated from each other, the leakage inductance of the transformer may be increased. Thus, there may be no need of a separate inductor to obtain a desired amount of the leakage inductance.

In other words, the amount of leakage inductance in the transformer may be determined depending on a degree of coupling between windings. Here, the first inductor winding L1 and the second inductor winding L2 are physically separated from each other such that the leakage inductance in the transformer increases.

Figure 3:
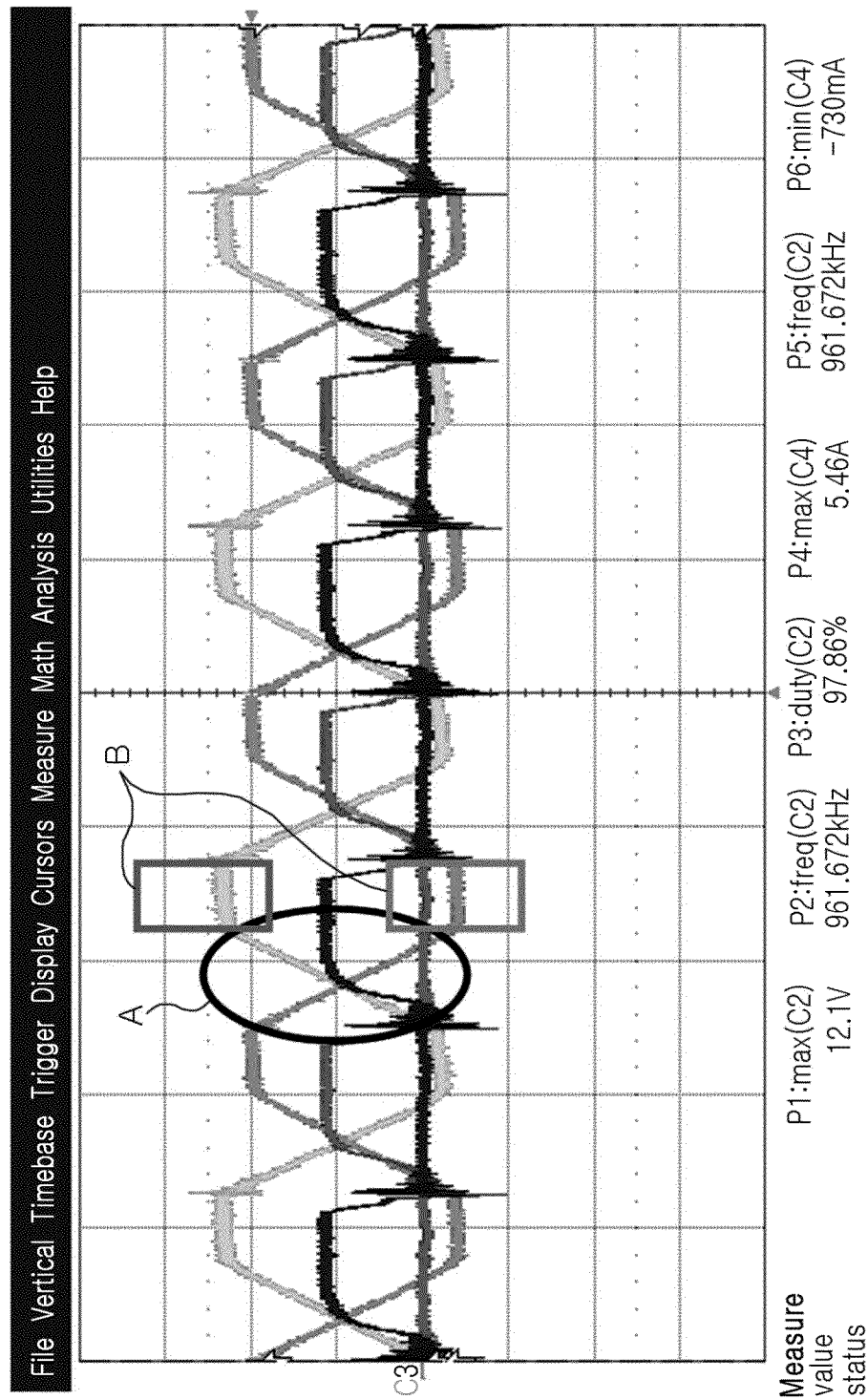
FIG. 3 is a graph of an operation waveform of a transformer according to an exemplary embodiment of the present invention.

As indicated by "A" in FIG. 3, when the first inductor L1 is charged and the second inductor L2 is discharged, that is, the first inductor L1 and the second inductor L2 operate conversely, there is no main inductance generated by the windings. This is due to the fact that no flux is generated in the core of a transformer when current flows conversely with respect to two individual coils wound in the same direction. Accordingly, the main inductance does not occur, and the leakage inductance remains in the first inductor winding L1 and the second inductor winding L2, thereby allowing the current to flow as indicated by "B". In this case, when the leakage inductance is very low or is not present, the power factor correction circuit may operate abnormally or may fail to perform a voltage boost operation. Therefore, in an interleaved type power factor correction circuit of the present invention, the first inductor winding L1 and the second inductor winding L2 are physically separated by dividing a winding area, while being integrated into a single transformer. This contributes to achieving sufficient leakage inductance to allow the power factor correction circuit to normally operate.

In addition, the first inductor winding L1 and the second inductor winding L2 may be wound in the same direction to obtain the same electrical effects.

The core part 122 may include a pair of cores 122a and 122b. The pair of cores may be an EE core; however may also be an EI core having the same combined form.

The pair of cores 122a and 122b may include a first leg Leg1 formed by magnetic coupling through insertion into the through hole of the bobbin part, and second and third legs Legg and Leg3 formed by magnetic coupling without insertion into the through hole.

FIGS. 4A through 4C show electrical characteristics of an interleaved type power factor correction circuit according to an exemplary embodiment of the present invention.

Referring to FIG. 4A together with FIG. 1, when the voltage level of the commercial alternating power (AC) Vac to be inputted is changed to 90V, 110V, 220V, and 264V, a power factor is maintained at 0.985, 0.980, 0.922, and 0.897. Thus, it can be seen that harmonic components have a normal level less than a predetermined level while improved power factor correction may be seen.

Referring to FIG. 4B together with FIG. 1, when the voltage level of the commercial alternating power Vac to be inputted is changed to 90V, 110V, 220V, and 240V, the power factor is maintained at 0.985, 0.980, 0.936 and 0.922. Thus, the stabilization of an output waveform as well as improved power factor correction can be seen.

Referring to FIG. 4C together with FIG. 1, the interleaved type power factor correction circuit of the present invention and a general interleaved type power factor correction circuit having two physically separated inductors have a power conversion efficiency of 93.9% and a power conversion efficiency of 94%, respectively. Thus, comparing input power with output power, it can be seen that the interleaved type power factor correction circuit of the present invention has almost the same power conversion efficiency as that of the general interleaved type power factor correction circuit.

As aforementioned, according to an exemplary embodiment of present invention, there is provided an interleaved type power factor correction circuit in which two physically separated inductors are integrated in a single transformer structure, while two inductor windings are separately wound around the transformer, whereby component costs as well as circuit areas can be reduced, compared to the case in which two inductor are simply used therein.

As set forth above, according to exemplary embodiments of the invention, an interleaved type power factor correction circuit forming a separated winding structure, which is formed by integrating two inductors separately wound around the transformer can achieve miniaturization and the reduction of manufacturing costs.

While the present invention has been shown and described in connection with the exemplary embodiments, it will be apparent to those skilled in the art that modifications and variations can be made without departing from the spirit and scope of the invention as defined by the appended claims.

What is claimed is:

1. An interleaved type power factor correction circuit, comprising:
    a rectifying unit configured to rectify a commercial alternating current (AC) power;
    a transformer including
        first and second inductor windings configured to individually receive the rectified power from the rectifying unit and to perform energy charge and discharge according to a switching operation,
        a bobbin part including a bobbin body having a predetermined length, a through hole penetrating the bobbin body in a lengthwise direction of the bobbin body, and a winding area provided on an outer circumferential surface of the bobbin body and having the first and second inductor windings wound therearound and a partition physically separating the first and second inductor windings, and
        a core part including a pair of cores having a first leg formed by magnetic coupling through the through hole of the bobbin part and second and third legs formed by magnetic coupling without passing through the through hole;
    a switching unit configured to individually switch the power transmitted to the first and second inductor windings;
    a controlling unit configured to control the switching operation of the switching unit in order to allow a phase difference between a current and a voltage of the switched power to satisfy a predetermined phase difference; and
    a stabilizing unit configured to stabilize the switched power from the switching unit.

2. The interleaved type power factor correction circuit of claim 1, wherein the first inductor winding and the second inductor winding are wound in the same direction.

3. The interleaved type power factor correction circuit of claim 1, wherein the switching unit comprises:
    a first switch configured to switch the power transmitted to the first inductor winding, and
    a second switch configured to switch the power transmitted to the second inductor winding.

4. The interleaved type power factor correction circuit of claim 1, wherein the stabilizing unit comprises:
    a first diode configured to provide a transmission path of the power transmitted from the first inductor winding according to the switching operation of the switching unit;
    a second diode configured to provide a transmission path of the power transmitted from the second inductor winding according to the switching operation of the switching unit; and
    a capacitor configured to be charged with the power transmitted from the first and second diodes to thereby stabilize the power.

5. The interleaved type power factor correction circuit of claim 4, wherein the controlling unit is configured to control the switching operation of the switching unit depending on a state of the power transmitted from the first and second diodes to the capacitor.

6. The interleaved type power factor correction circuit of claim 1, wherein the pair of cores includes an EE core or an EI core.

7. The interleaved type power factor correction circuit of claim 1, wherein
    the winding area includes
        a first winding area for winding the first inductor winding, and
        a second winding area for winding the second inductor winding, and
    the partition is arranged between the first winding area and the second winding area.

* * * * *